United States Patent
Althoff et al.

(10) Patent No.: US 8,075,275 B2
(45) Date of Patent: Dec. 13, 2011

(54) WIND TURBINE SPARS WITH JOINTED SHEAR WEBS

(75) Inventors: Nicholas K. Althoff, Ware Shoals, SC (US); Eric M. Jacobsen, Greenville, SC (US); Jan W. Bakhuis, Nijverdal (NL)

(73) Assignee: General Electric Company, Schenectady, NY (US)

( * ) Notice: Subject to any disclaimer, the term of this patent is extended or adjusted under 35 U.S.C. 154(b) by 1111 days.

(21) Appl. No.: 11/862,520

(22) Filed: Sep. 27, 2007

(65) Prior Publication Data

US 2009/0087318 A1   Apr. 2, 2009

(51) Int. Cl.
  *F03D 11/02* (2006.01)
  *F03D 1/06* (2006.01)
(52) U.S. Cl. ..... 416/226; 416/230; 29/889.7; 29/889.72
(58) Field of Classification Search .................... 29/889, 29/889.7, 889.71, 889.72; 416/84, 226, 230, 416/241 A See application file for complete search history.

(56) References Cited

U.S. PATENT DOCUMENTS

| | | | |
|---|---|---|---|
| 4,331,495 A | | 5/1982 | Lackman et al. |
| 4,732,542 A | * | 3/1988 | Hahn et al. ............... 416/226 |
| 5,417,549 A | * | 5/1995 | Purse et al. ............... 416/226 |
| 5,476,704 A | * | 12/1995 | Kohler ...................... 428/119 |
| 6,786,452 B2 | | 9/2004 | Yamashita et al. |
| 2004/0014080 A1 | | 1/2004 | Tanga et al. |
| 2005/0214122 A1 | * | 9/2005 | Sorensen et al. .......... 416/233 |
| 2008/0219851 A1 | * | 9/2008 | Althoff et al. ............. 416/226 |

FOREIGN PATENT DOCUMENTS

WO  WO 2007048408 A1 *  5/2007

OTHER PUBLICATIONS

U.S. Department of Energy, National Renewable Energy Laboratory, Publication No. NREL/SR-500-29492 (Apr. 2001) available at www.nrel.gov/docs/fy01osti/29492.pdf.

\* cited by examiner

*Primary Examiner* — Edward Look
*Assistant Examiner* — Jesse Prager
(74) *Attorney, Agent, or Firm* — William F. Heinze; Ernest G. Cusick; Frank A. Landgraff

(57) ABSTRACT

A spar for a wind turbine blade includes at least one shear web extending between pressure and suction sides of the blade; and a joint, arranged substantially midway between ends of the shear web, for sizing the shear web. The joint may include a resilient and/or expandable spacer.

16 Claims, 4 Drawing Sheets

WIND TURBINE SPARS WITH JOINTED SHEAR WEBS

BACKGROUND OF THE INVENTION

1. Technical Field

The subject matter described here generally relates to fluid reaction surfaces with specific blade structures that are formed with a main spar, and, more particularly, to wind turbine blade spars having jointed shear webs.

2. Related Art

A wind turbine is a machine for converting the kinetic energy in wind into mechanical energy. If that mechanical energy is used directly by machinery, such as to pump water or to grind wheat, then the wind turbine may be referred to as a windmill. Similarly, if the mechanical energy is further transformed into electrical energy, then the turbine may be referred to as a wind generator or wind power plant.

Wind turbines use one or more airfoils in the form of a "blade" to generate lift and capture momentum from moving air that is them imparted to a rotor. Each blade is typically secured at its "root" end, and then "spans" radially "outboard" to a free, "tip" end. The front, or "leading edge," of the blade connects the forward-most points of the blade that first contact the air. The rear, or "trailing edge," of the blade is where airflow that has been separated by the leading edge rejoins after passing over the suction and pressure surfaces of the blade. A "chord line" connects the leading and trailing edges of the blade in the direction of the typical airflow across the blade.

Wind turbines are typically categorized according to the vertical or horizontal axis about which the blades rotate. One so-called horizontal-axis wind generator is schematically illustrated in FIG. 1. This particular configuration for a wind turbine 2 includes a tower 4 supporting a drive train 6 with a rotor 8 that is covered by a protective enclosure referred to as a "nacelle." The blades 10 are arranged at one end of the rotor 8 outside the nacelle for driving a gearbox 12 connected to an electrical generator 14 at the other end of the drive train 6 inside the nacelle.

The blades 10 for such wind turbines 2 are typically fabricated by securing various "shell" and/or "rib" portions to one or more "spar" members extending spanwise along the inside of the blade for carrying most of the weight and aerodynamic forces on the blade. Spars are typically configured as I-shaped beams having a web, referred to as a "shear web," extending between two flanges, referred to as "caps" or "spar caps," that are secured to the inside of the suction and pressure surfaces of the blade. However, other spar configurations may also be used including, but not limited to "C-," "L-," "T-," "X-," "K-," and/or box-shaped beams. The shear web may also be utilized without caps.

For example, one so-called "box-spar" blade configuration with forward and aft shear webs extending between the ends of two spar caps is illustrated in the U.S. Department of Energy, National Renewable Energy Laboratory, Publication No. NREL/SR-500-29492 (April 2001). Commonly-assigned and co-pending U.S. patent application Ser. No. 11/684,230 filed on Mar. 9, 2007 by Alhoff et al. discloses various other configurations, including web portions that are adhesively bonded to and/or integrated with shell portions of the blade. In one embodiment, an adhesive joint is disposed between web portions extending from two integrated shells. Other embodiments include spar caps which are adhesively joined to shell portions and/or web portions. The adhesive joints may also include incorporation into the shell portions by matrix infusion.

However, such conventional approaches have been found to suffer from a variety of drawbacks. For example, turbine blade shells and spars must often be manufactured with large dimensional tolerances. Those tolerances can then accumulate to create wide gaps where the parts are joined together and/or joined with other parts of the blade 10. As illustrated in the schematic cross section of the wind turbine blade 10 that is shown in FIG. 2, any dimensional discrepancies between the shell 20 and the spar 22 will increase the amount of bonding material 24 that is required in order to fill the resulting gaps between the shell and the spar and/or the gaps between the shear web 26 and/or the spar caps 28. Such thick bond lines can add substantial weight and stress to the blade. Moreover, these low-strength, high-weight bond lines are located just where stresses on the blade are likely to be highest.

BRIEF DESCRIPTION OF THE INVENTION

These and other drawbacks of such conventional approaches are addressed here by providing, in various configurations, a spar for a wind turbine blade, including at least one shear web extending between pressure and suction sides of the blade; and a joint, arranged substantially midway between ends of the shear web, for sizing the shear web. Also provided is a wind generator, including a tower supporting a rotor that is connected to a gearbox and a generator; at least one hollow blade, extending radially from the rotor, with a at least one shear web extending between pressure and suction sides of the blade: and the shear web having a gap that is at least partially filled with a resilient spacer for sizing the shear web. Also provided is a method of assembling a wind turbine blade, including the steps of obtaining a first shell having a first shear web segment extending therefrom; obtaining a second shell having a second shear web segment extending therefrom; and joining the first shear web segment with the second shear web segment.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
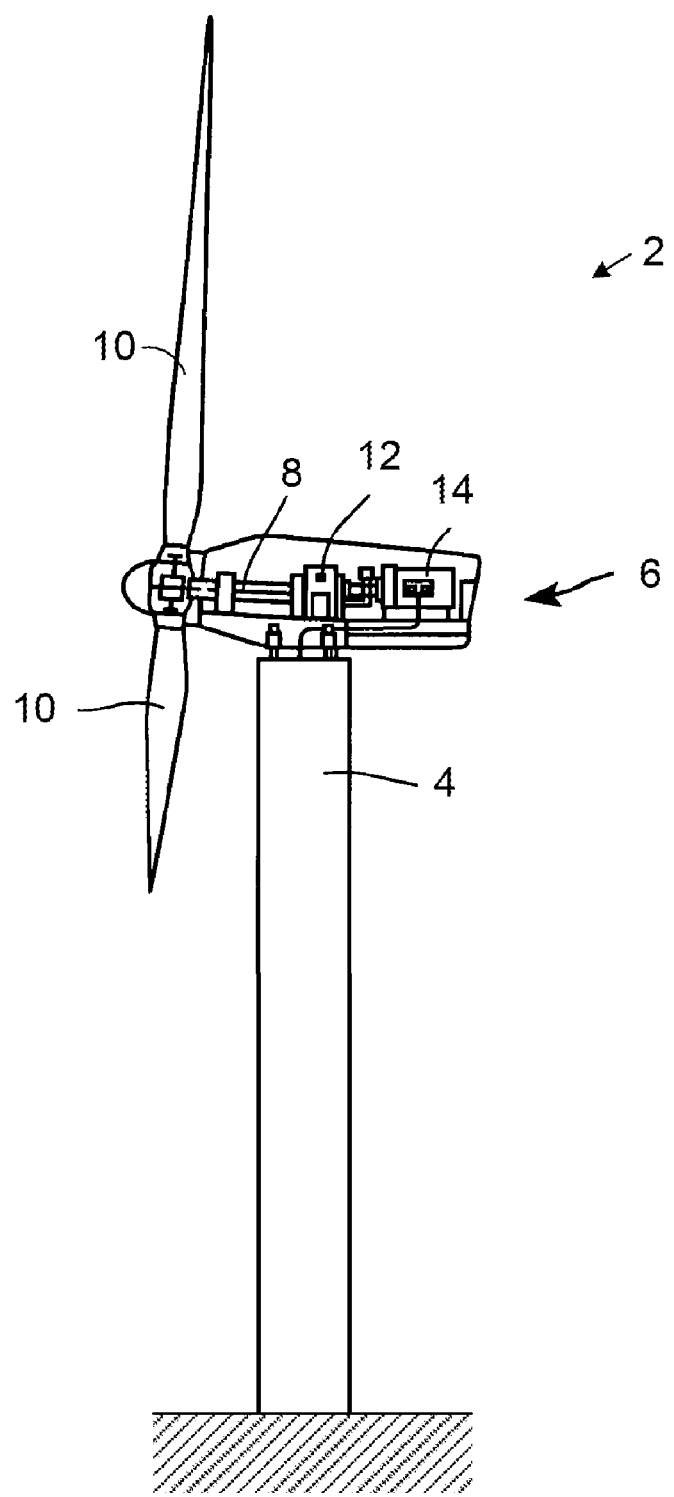
FIG. 1 is a schematic side view of a conventional wind turbine.
Figure 2:
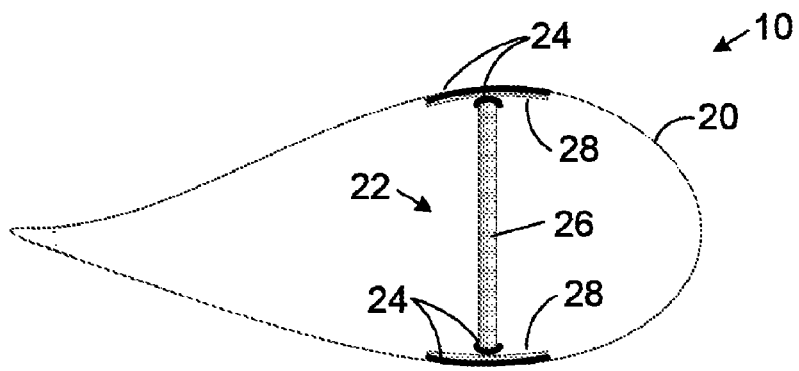
FIG. 2 is a schematic cross-sectional view of the conventional wind turbine blade in FIG. 1.
Figure 3:
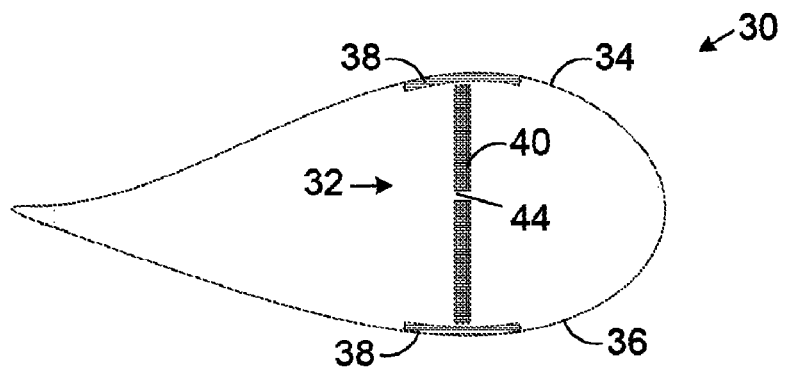
FIG. 3 is a schematic cross-sectional view of a wind turbine blade for use with the wind turbine shown in FIG. 1.

FIG. 3 is a schematic cross-sectional view of a wind turbine blade 30 for use with the wind generator shown in FIG. 1, or any other wind turbine. Although the wind turbine blade 30 illustrated in FIG. 3 here includes a hollow shell 20 with substantially the same configuration as in FIG. 2, any other shell configuration may also be used. The shell may be formed from any conventional material, such as glass-reinforced plastic, glass-reinforced epoxy, fiber-reinforced plastic, fiber-reinforced polymer, and/or other materials, where the fibers may include fiberglass, chopped strand mat, woven mat, carbon fibers, aramid fibers, and/or other materials. Various processes may be used to form the shell, including lamination with hand lay-up or spray lay-up, and molding.

In FIG. 3, the shell 20 of the blade 30 is supported by a spar 32 which extends between the pressure side 34 and the suction side 36 of the skin 20 inside the blade 30. For the example illustrated in FIG. 3, the spar 32 has an I-beam configuration with spar caps 38 arranged at each end of the shear web 40. However, other spar configurations may also be used, such as those discussed above, including those without the spar caps 38 in which the shear web 40 is connected directly to the shell (and/or other components of the blade 30), those spars that extend only partially along the span of the blade 30, and those spars (and/or other structural components) that may extend in other directions besides parallel to the span of the blade 30. Although the spar 32 is typical formed from the same materials and processes that are used to form the shell, other materials and/or processes may also be used, including those disclosed in commonly-assigned and co-pending U.S. patent application Ser. No. 11/684,230 filed on Mar. 9, 2007 by Alhoff et al.

With or without the spar caps 38, the ends of the spar 32 may be secured to the pressure and suction sides 34, 36 of the skin 20 in any conventional manner, including adhesive bonding and/or fastening. Alternatively, or in addition, the blade 30 may be formed with an integrated shear web 40 as disclosed in commonly-assigned and co-pending U.S. patent application Ser. No. 11/684,230 filed on Mar. 9, 2007 by Alhoff et al. entitled "Integrated Shear Webs for Wind Turbine Blades" which is incorporated by reference here.

The spar 32 includes a joint 42 that, in the examples illustrated in FIGS. 3 through 14, is arranged substantially midway between the ends of the shear web that are secured to the skin 20. Since this position in the spar 32 is typically under the least stress, a relatively weak joint 42 can be used, thus simplifying and adding less material and weight to the blade 30. For example, the butt joint illustrated in FIG. 3 includes a gap 44 that may be filled, or partially filled, with a bonding material. Since the position of the joint 42 allows it to be relatively weak, a relatively weak bonding material may be used to fill the gap 44, and/or a smaller (and lighter) amount of a stronger material may be used.

Figure 15:
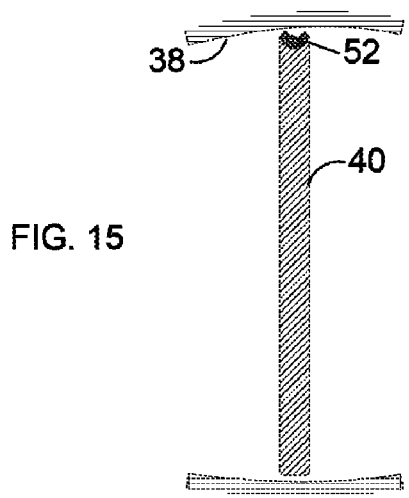
FIG. 15 is a schematic cross-sectional view of another spar for the wind turbine blade shown in FIG. 3.

However, the joint 42 may also be located at other positions along the spar 32. For example, the joint 42 shown in FIG. 15 is arranged between the end of the spar 32 and one of the spar caps 38. For positions along the spar that are mostly in compression during normal operation, a bonding material with relatively weak tensile strength may be used to fill the gap. Similarly, for positions along the spar that are mostly in tension during normal operation, a bonding material with relatively weak compressive strength may be used to fill the gap. In order to prevent the gap from reopening after assembly, an adhesive boding material may be used and the adhesive bonding material may be reinforced with fibers in order to give it additional strength and minimize the amount of denser adhesive that would otherwise be required to fill the gap 44.

The gap 44 also allows the shear web 40 to be sized to accurately fit the distance between the pressure side 34 and suction side 36 of the shell 20. For example, the gap 44 may be lengthened or shortened in order to accommodate dimensional variances along the span of the spar 32. Varying amounts of bonding material, including adhesive bonding material, may then used to fill just the gap 44, as needed, in order to maintain the appropriate length of the spar 32.

Figures 4, 5:
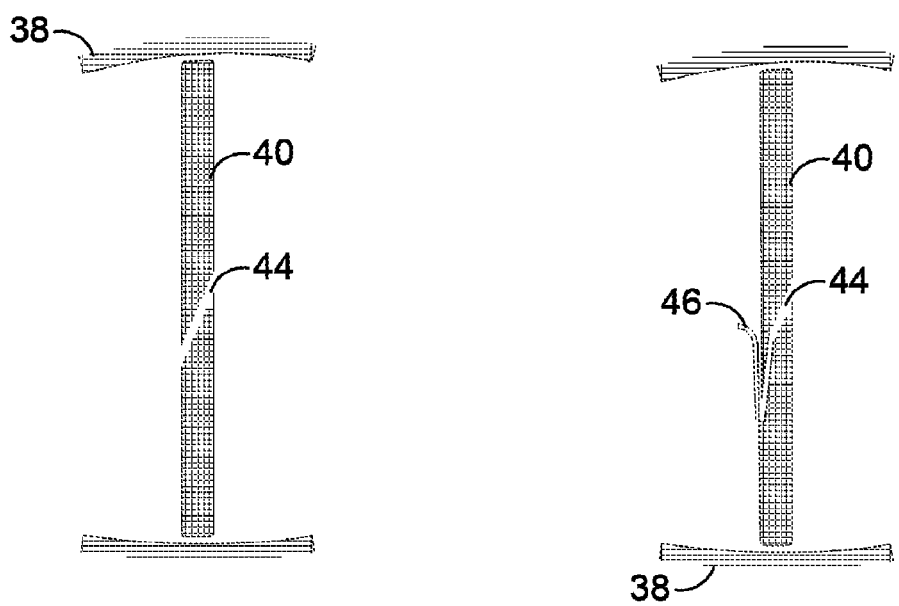
FIG. 4 is a schematic cross-sectional view of a spar for the wind turbine blade shown in FIG. 3.
FIG. 5 is a schematic cross-sectional view of another spar for the wind turbine blade shown in FIG. 3.

Other configurations may also be used for the joint 42, including, but not limited to biscuit, bridle, butterfly, dowel, coping, cope and stick, dado, housing, dovetail, finger, box combing, lap, cross-lap, halved, dovetail-lap, end-lap, halving joint, middle-lap, miter, mortise and tenon, pocket-hole, rabbet or rebate, scarf or scarph, splice, tongue and groove, frame and panel, rail and style, splice, half-lap splice, table splice, bevel lap splice. For example, FIG. 4 illustrates a scarf joint with opposing tapered ends on each side of the gap 44. The scarf joint 42 shown in FIG. 4 allows the tapers to be slid against each other when two sections of the spar 32 on opposite sides of the gap 44 are not accurately aligned with each other.

Figure 6:
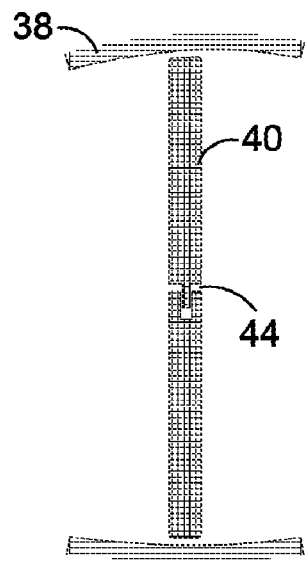
FIG. 6 is a schematic cross-sectional view of another spar for the wind turbine blade shown in FIG. 3.
Figure 7:
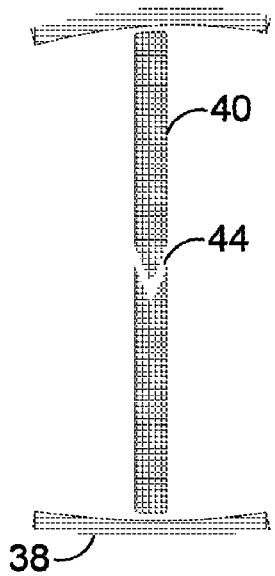
FIG. 7 is a schematic cross-sectional view of another spar for the wind turbine blade shown in FIG. 3.
Figure 8:
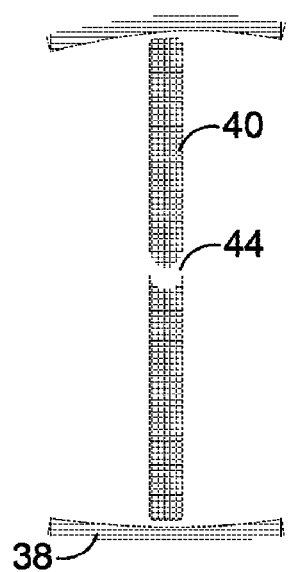
FIG. 8 is a schematic cross-sectional view of another spar for the wind turbine blade shown in FIG. 3.

FIGS. 5 through 8 illustrate several examples of other configurations for the joint 42 that may provide an optional interference fit, sometimes referred to as a press fit, where the fastening between two parts is achieved at least in part by friction as the parts are pushed together. However, adhesive bonding material, including reinforced adhesive bonding material, may also be used in the gap 44 in such interference joints. When used with adhesive bonding material, such intereference joints can be particularly useful for holding together opposite sides of the spar 32 while the bonding material sets. FIG. 6 illustrates one type of tongue and groove joint. FIG. 5 illustrates a beveled tongue and groove joint including a tab 46 for further opening the groove. FIG. 7 illustrates a V-shaped joint while FIG. 8 illustrates a U-shaped joint.

Figure 9:
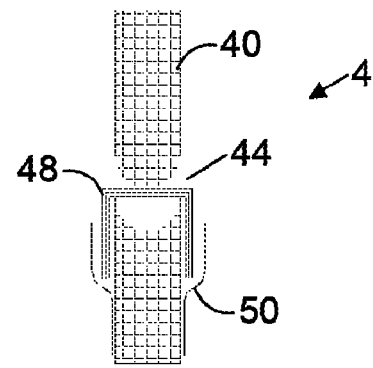
FIG. 9 is an enlarged schematic cross-sectional view of a joint for use with the spar shown in FIG. 8.
Figure 10:
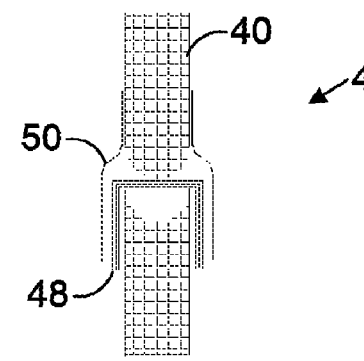
FIG. 10 is an enlarged schematic cross-sectional view of another joint for use with the spar shown in FIG. 8.

FIGS. 9 and 10 are enlarged schematic cross-sectional views of the joint 42 for the spar 32 shown in FIG. 8 that are being secured with a reinforced adhesive bonding material 48. In the examples shown in FIGS. 9 and 10, the reinforced adhesive bonding material 48 is illustrated as a fiber reinforced plastic, and, more particularly a glass reinforced resin using one or more layers of resin impregnated chopped strand and/or woven mat. However, other reinforcing and adhesive materials may also be used. The resin-impregnated layers of the reinforced adhesive bonding material 48 are laid over the concave portion of the joint 42 before the gap 44 is at least partially closed in order to bring each segment of the shear web 40 into contact with the material 48. The gap 44 is thus at least partially filled with the reinforced adhesive bonding material 48. An optional coupling 50 may also be provided for securing the reinforced adhesive bonding material 48 on the shear web 40 and/or in the gap 44 during completion of the joint 42. The coupling 50 also provides additional structural support to the joint 42 and prevents the reinforced adhesive bonding material 48 from falling out of the gap 44 during curing.

Figure 11:
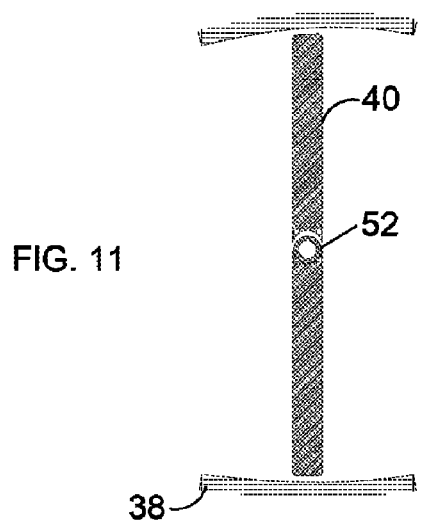
FIG. 11 is a schematic cross-sectional view of another spar for the wind turbine blade shown in FIG. 3.
Figure 12:
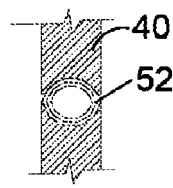
FIG. 12 is an enlarged schematic cross-sectional view of the joint shown in FIG. 11.

FIG. 11 is a schematic cross-sectional view of another spar for the wind turbine blade shown in FIG. 3 while FIG. 12 is an enlarged schematic cross-sectional view of a joint 42 in FIG.

11. In these figures, the joint 42 is provided with a generally tubular-shaped gap 44 that is filled with a correspondingly tubular spacer 52. The spacer 52 may be covered with adhesive, such as the one or more layers of reinforced adhesive bonding material 48 illustrated in FIG. 12. The spacer 52 may also be formed from a resilient material, such as soft tubing, rolled paper, or sponge, that urges the adhesive covering into contact with the abutting surfaces of the shear web 40. Multiple spacers 52 may also be used in the same gap 44.

Figure 13:
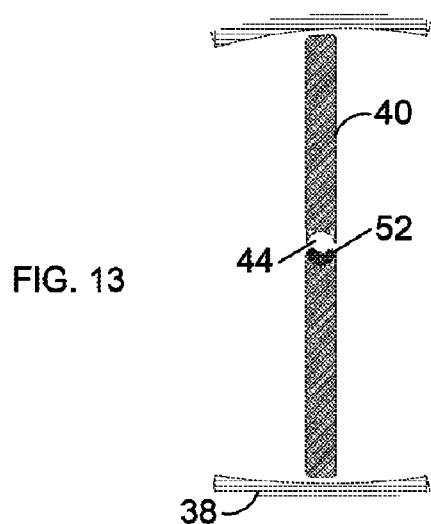
FIG. 13 is a schematic cross-sectional view of another spar for the wind turbine blade shown in FIG. 3.
Figure 14:
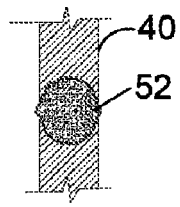
FIG. 14 is an enlarged schematic cross-sectional view of the joint shown in FIG. 13.

Alternatively, or in addition, the spacer 52 may be expandable as illustrated in the examples shown in FIGS. 13 through 16. In FIG. 13, the joint 42 is configured with a spacer 52 formed as an inflatable, tubular bladder generally corresponding to the shape of the gap 44. However, other filling materials besides air may also be used. In this example, the spacer 52 is again covered with an optional adhesive, such as the one or more layers of reinforced adhesive bonding material 48. When inflated, or otherwise expanded, the spacer 52 shown in FIG. 14 fills the gap 44 and compresses any adhesive coating against each side of the shear web 40. If subsequently emptied, the cured, reinforced adhesive bonding material 48 will then maintain the structural integrity of the shear web 40.

Figure 16:
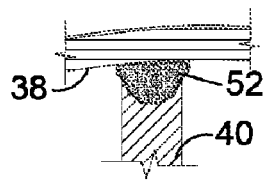
FIG. 16 is an enlarged schematic cross-sectional view of the joint shown in FIG. 15.

The bladder may be inflated to a relatively low pressure in order to maintain its resilience during the assembly process for the blade 10. Alternatively, the bladder may be inflated to higher pressures and/or filled with less compressible material in order to achieve a stiffer form that is particularly useful while any adhesive in the assembled blade 10 is curing. As illustrated in FIGS. 15 and 16, the spacer 52 from FIGS. 13 and 14 may also be arranged at other positions along the shear web 40, including at the end of the shear web adjacent to either of the spar caps 38.

Although a variety of techniques may be used to create a wind turbine blade using the technology described above, one method of assembly includes starts with forming or otherwise obtaining a first and second shells 20 having a first and second shear web 40 segments extending from the respective shells. The first and second shear web 40 segments are then joined, where the joint may be arranged substantially midway between the ends of the shear web 40. For example, the joining of the shear web 40 step may include at least partially filling the gap 44 between the first and second web segments with fiber-reinforced adhesive bonding material and/or the spacer 52.

The technology described above offers a variety of advantages over conventional approaches. For example, it accommodates a wide range of dimensional discrepancies in multiple components of the blade 30 by consolidating those tolerances in a single location on the spar 32, such as midway between the ends of the shear web 40 where the stress on the resulting joint is minimized. It also helps to minimize the amount of adhesive and/or other bonding material that is required to fill the gap 44 by minimizing the overflow and/or including a spacer or other reinforcing material in the gap 44. The spacer may also be resilient and/or expandable in order to better fill the gap with less bonding material.

It should be emphasized that the embodiments described above, and particularly any "preferred" embodiments, are merely examples of various implementations that have been set forth here to provide a clear understanding of various aspects of this technology. These embodiments may be modified without substantially departing from scope of protection defined solely by the proper construction of the following claims.

What is claimed is:

1. A spar for a wind turbine blade, comprising:
   at least one shear web extending between pressure and suction sides of the blade;
   a joint, arranged substantially midway between ends of the shear web, for sizing the shear web; and
   a resilient spacer, including an expandable bladder, arranged in the shear web.

2. The spar recited in claim 1, wherein the joint includes an interference fit joint.

3. The spar recited in claim 1, wherein the joint is at least partially filled with an adhesive bonding material.

4. The spar recited in claim 2, wherein the joint is at least partially filled with an adhesive bonding material.

5. The spar recited in claim 4, wherein the adhesive bonding material comprises fiber reinforcing material.

6. The spar recited in claim 1 wherein the resilient spacer is at least partially coated with fiber-reinforced adhesive.

7. The spar recited in claim 1 wherein the resilient spacer is at least partially wrapped with fiber-reinforcement.

8. A wind generator, comprising:
   a tower supporting a rotor that is connected to a gearbox and a generator;
   at least one hollow blade, extending radially from the rotor, with a at least one shear web extending between pressure and suction sides of the blade; and
   the shear web having a gap that is at least partially filled with a resilient spacer, including an expandable bladder, for sizing the shear web.

9. The wind generator recited in claim 8, wherein the resilient spacer is at least partially coated with fiber-reinforced adhesive.

10. The wind generator recited in claim 9 wherein the gap is arranged substantially midway between ends of the shear web.

11. A method of assembling a wind turbine blade, comprising the steps of:
    obtaining a first shell having a first shear web segment extending therefrom;
    obtaining a second shell having a second shear web segment extending therefrom; and
    joining the first shear web segment with the second shear web segment;
    wherein said joining step comprises at least partially filling a gap with a resilient spacer including an expandable bladder.

12. The method recited in claim 11, wherein the joining step further comprises at least partially filling the gap between the first and second web segments with fiber-reinforced adhesive bonding material.

13. The method recited in claim 11, wherein said joining step further comprises expanding the spacer to at least partially fill the gap.

14. The method recited in claim 13, wherein said joining step comprises joining the first shear web segment with the second shear web segment at a location substantially midway across a combined length of the first and second shear web segments.

15. The method recited in claim 14, wherein said joining step comprises joining the first shear web segment with the second shear web segment at a location substantially midway across a combined length of the first and second shear web segments.

16. The method recited in claim 12, wherein said joining step comprises joining the first shear web segment with the second shear web segment at a location substantially midway across a combined length of the first and second shear web segments.

* * * * *